(12) United States Patent
Hsu et al.

(10) Patent No.: US 8,288,999 B2
(45) Date of Patent: Oct. 16, 2012

(54) CHARGING CIRCUIT FOR BALANCE CHARGING SERIALLY CONNECTED BATTERIES

(75) Inventors: Deng-Hsien Hsu, Taipei (TW);
Wen-Ping Tsai, Taipei (TW);
Zong-Long Yu, Shanghai (CN)

(73) Assignee: Aeneas Energy Technology Co., Ltd. (TW)

( * ) Notice: Subject to any disclaimer, the term of this patent is extended or adjusted under 35 U.S.C. 154(b) by 421 days.

(21) Appl. No.: 12/471,728

(22) Filed: May 26, 2009

(65) Prior Publication Data
US 2009/0230921 A1 Sep. 17, 2009

Related U.S. Application Data

(63) Continuation-in-part of application No. 11/652,532, filed on Jan. 12, 2007, now abandoned.

(30) Foreign Application Priority Data

Aug. 1, 2006 (TW) ................................ 95128140 A (51) Int. Cl.
*H02J 7/16* (2006.01)
*H02J 7/04* (2006.01)
(52) U.S. Cl. ........ 320/137; 320/134; 320/132; 320/136; 320/128
(58) Field of Classification Search .................. 320/116, 320/119, 104, 120, 118, 103, 121, 128, 134, 320/136
See application file for complete search history.

(56) References Cited

U.S. PATENT DOCUMENTS

| 7,126,342 | B2* | 10/2006 | Iwabuchi et al. | 324/426 |
|---|---|---|---|---|
| 7,825,627 | B2* | 11/2010 | Bucur | 320/116 |
| 7,928,691 | B2* | 4/2011 | Studyvin et al. | 320/116 |
| 2005/0127873 | A1* | 6/2005 | Yamamoto et al. | 320/116 |
| 2006/0091857 | A1* | 5/2006 | Nakanishi et al. | 320/116 |
| 2006/0103349 | A1* | 5/2006 | Yamamoto | 320/116 |
| 2007/0018613 | A1* | 1/2007 | Miyazaki et al. | 320/116 |
| 2007/0285054 | A1* | 12/2007 | Li et al. | 320/116 |

OTHER PUBLICATIONS

Office Action (Mail Date Dec. 26, 2008) for U.S. Appl. No. 11/652,532, filed Jan. 12, 2007; Confirmation No. 3427.

* cited by examiner

*Primary Examiner* — Edward Tso
*Assistant Examiner* — Alexis Boateng
(74) *Attorney, Agent, or Firm* — Schmeiser, Olsen & Watts, LLP (57) ABSTRACT

A charging circuit includes a battery pack having a plurality of serially connected batteries and being connected to a power supply; a changeover switch being serially connected to and between any two adjacent batteries; and a precision voltage detector being parallelly connected to each of the batteries for independently detecting a voltage of the connected battery and sending out a detected result to a charging control circuit for controlling the ON/OFF of the changeover switch corresponding to the battery. When a battery is detected by a corresponding precision voltage detector as having been fully charged, the corresponding charging control circuit sets the changeover switch corresponding to the battery to OFF to stop charging the battery. The remaining batteries that are subsequently fully charged are disconnected from the power source one by one until all the batteries in the battery pack have been fully charged. Thus, all the batteries are balance-charged.

6 Claims, 5 Drawing Sheets

CHARGING CIRCUIT FOR BALANCE CHARGING SERIALLY CONNECTED BATTERIES

RELATED APPLICATION

The present invention is a continuation-in-part of U.S. patent application Ser. No. 11/652,532, filed Jan. 12, 2007 now abandoned and entitled "CHARGING CIRCUIT FOR BALANCE CHARGING SERIALLY CONNECTED BATTERIES" and is incorporated herein by reference in its entirety.

FIELD OF THE INVENTION

The present invention relates to a charging circuit for balance charging serially connected batteries, and more particularly to a charging circuit that is designed for charging a plurality of serially connected batteries while the batteries being charged are independently detected and controlled by a charging control circuit.

BACKGROUND OF THE INVENTION

With the quickly increased demands for all kinds of portable electronic products, such as digital camera, personal digital assistant (PDA), MP3, etc., there are also increasing demands for high-capacity rechargeable batteries that can be fully charged within a largely shortened time with a compact and lightweight charger that has low manufacturing cost and long service life.

While the currently available chargers have different advantages and disadvantages, most of them fail to meet the above-mentioned requirements of being compact, lightweight, economical, and durable. Therefore, it is still desirable to improve the conventional chargers.

Figure 1:
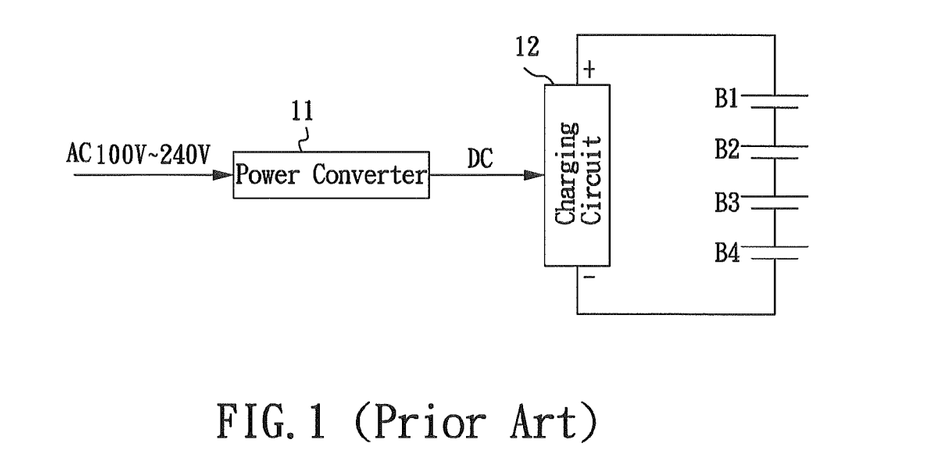
FIG. 1 is a schematic circuit diagram of a conventional serial charger.

FIG. 1 shows a charging circuit 12 for a conventional serial charger. As shown, an alternating current (AC) of 100V-240V is converted by a power converter 11 into a direct current (DC) charging voltage, which is used to charge a plurality of serially connected batteries B1, B2, B3, B4 via the charging circuit 12. While the above-described conventional serial charger has simple structure and low price, it does not ensure all the serially connected batteries are balance-charged. In other words, it is possible some of the serially connected batteries are fully charged while others are not. As a result, some of the batteries might be excessively charged to cause dangers, while others are still not fully charged when the charging stops; or, some of the batteries would become deteriorated and have reduced service life due to being repeatedly recharged or discharged.

Figure 2:
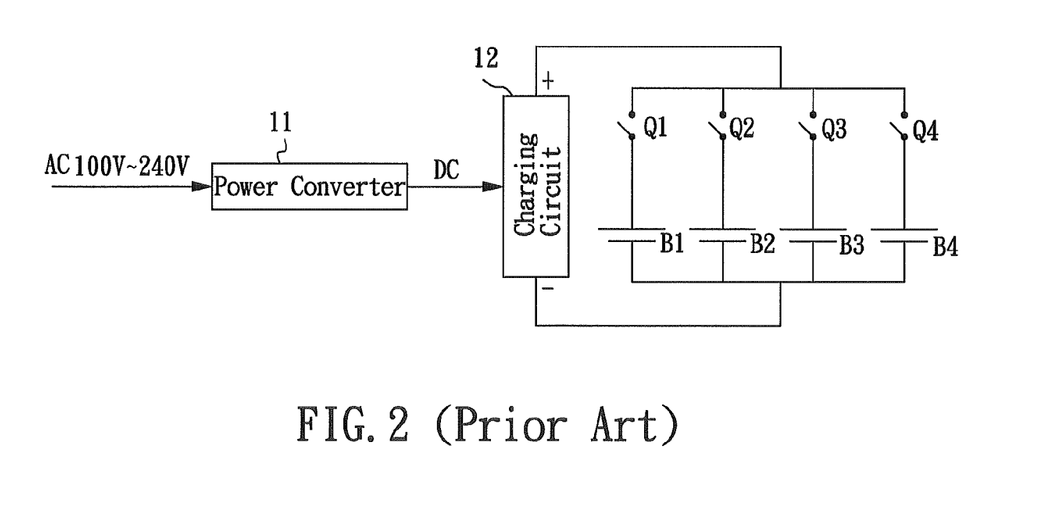
FIG. 2 is a schematic circuit diagram of a conventional parallel charger.

FIG. 2 shows a charging circuit 12 for a conventional parallel charger. A plurality of parallelly connected batteries B1, B2, B3, B4 are charged via the charging circuit 12. With the parallel charger, the parallelly connected batteries have similar charging voltage without the risk of being excessively charged. However, the parallel charger fails to meet the requirement of quick charging. Moreover, it is uneasy to select and arrange suitable electronic control elements for the parallel charger. For instance, when the charging voltage is 3.7V, and each of the parallelly connected batteries has a charging current of 1.5 A, total 6 amperes of charging current is required. And, since voltage difference is existed among different transistors included in the charging circuit of the parallel charger, there are many difficulties to be overcome before a low-voltage high-current charging circuit can be formed. For example, since the wiring on the circuit board of the parallel charger must not be less than 6 mm to meet relevant safety code, the parallel charger usually has a large volume and the components thereof tend to produce high amount of heat. Moreover, it is uneasy to achieve the effect of high-volume quick charging with the parallel charger. Therefore, the conventional parallel charger no longer meets the market demands now. When it is desired to increase the charging voltage to thereby enhance the power and reduce the current of the parallel charger, the voltage differences among the switch transistors Q1, Q2, Q3, Q4 included in the charging circuit 12 would cause the tough problem of high temperature. In the event heat radiation elements are added in an attempt to radiate heat produced by the transistors, the parallel charger would have excessively large volume and largely increased manufacturing cost.

Therefore, the main goal of all charging circuits is trying to able to charge every single battery fully and equally in the circuit without some of batteries either over-charged or under-charged. The conventional dissipative balance charging and non-dissipative balance charging circuits are designed to improve the charging condition in the circuit.

A dissipative balance charging is disclosed in U.S. Patent Number 2005/0127873 A1, the battery A is set to a pre-determined valve, so once the voltage reaches to the pre-determined valve, the charge current in the circuit will change via the switch device. In other words, when the charge voltage of battery A reaches to the pre-determined valve, the charge current of the circuit will flow to the discharge resistor first to dissipate some of its voltage before passing through battery A so that the charge current flows to the battery A will be lowered than the charge current in battery B in order to provide a balance charging condition in the circuit. As a result, such charging circuit is designed to be used for the batteries that are connected in series. When only one of the batteries is fully charged in the circuit, the charge current will be discharged off partially or completely at the discharge resistor in order to prevent the fully charged battery from over-charging which can cause substantially damage to the battery.

However, the dissipative balance charging circuit disclosed in U.S. Patent Number 2005/0127873 A1 can cause the temperature in the circuit to rise when the charge current is discharged or dissipated at the discharge resistor because the discharge energy is transformed into the heat energy and the heat cannot be dissipated out easily which will result the charging circuit less reliable and become unstable. Further when a large amount of charge current is required, then the dissipative balance charging circuit will generate more heat energy to dissipate the charge current. Therefore, this kind of conventional circuit will not be suitable for the large charging current. Moreover, this kind of dissipative balance charging circuit cannot effectively utilize the energy.

Figure 3:
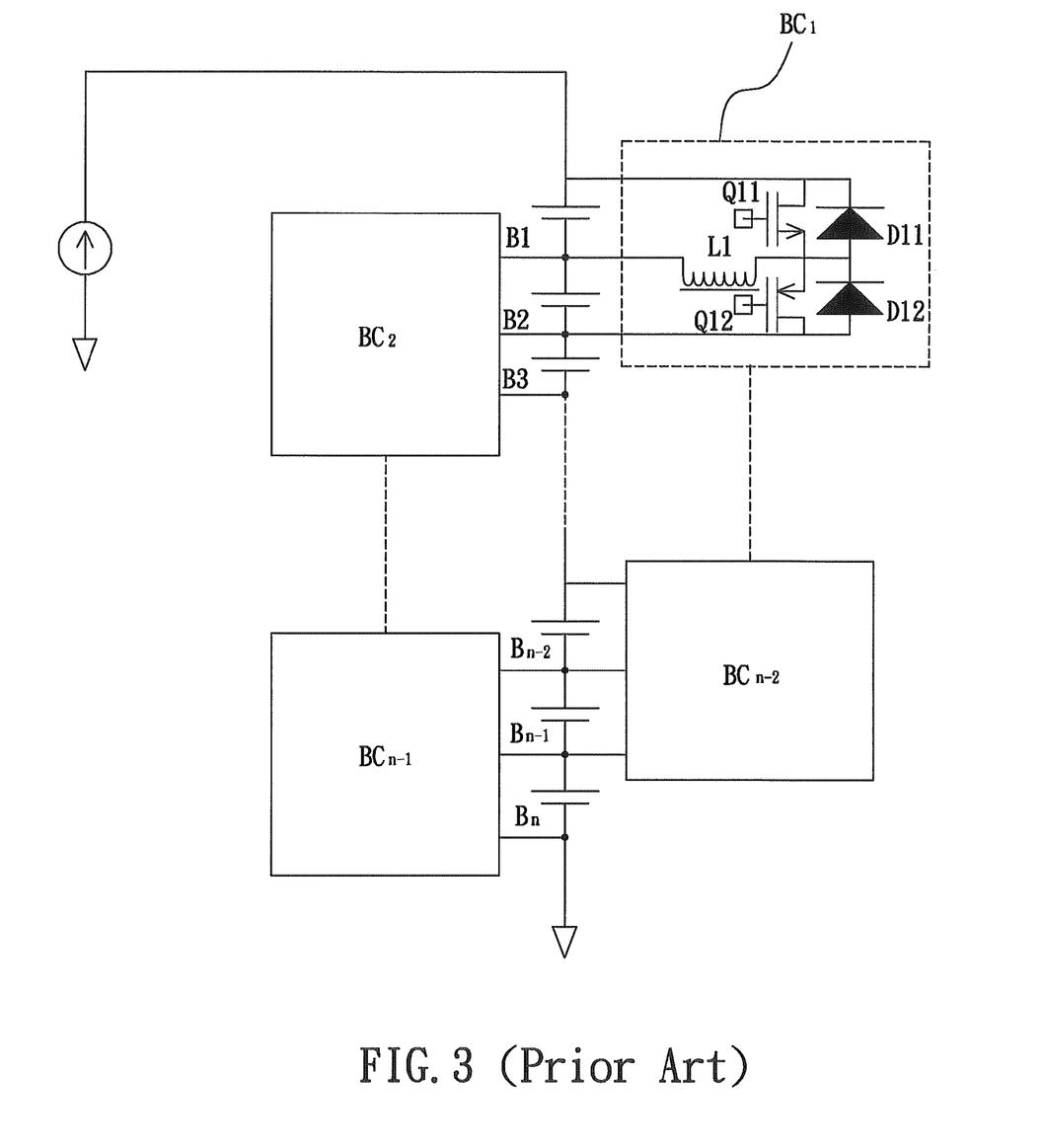
FIG. 3 is a schematic view of a conventional non-dissipative balance charging circuit.

An other type of conventional balance charging circuit is shown in FIG. 3. This non-dissipative balance charging circuit comprises a plurality of balance circuits, wherein the balance circuits are designed to charge the batteries connected in series respectively. Each battery set having several batteries is being charged independently by its corresponding balance circuit, wherein the balance circuit comprises two Field Effect Transistor (FET) Q11 & Q12, two diode D and once energy storage inductor L1. When a misbalance condition occurs due to the voltage different between two of the batteries of the battery balance circuit $BC_1$, for example when the voltage of B1 is greater than voltage of B2, the FET Q11 will be switched on, and energy storage inductor L1 will be charged by the battery B1. When the FET Q11 is switched off, the energy storage inductor L1, the battery B2 and the diode D12 will be connected. As a result, the energy stored at the energy storage inductor L1 will be transferred to the battery B2. Similarly, during the charging operation, when the voltage of B2 is greater than the voltage of B1, the switching states of the FET Q12 will be used to transfer energy from battery B2 to battery B1. Therefore, this type of balance charging circuit is a balance device of energy bi-directional transmission by transferring energy from high voltage to the low voltage in order to achieve the equilibrium in the circuit.

Therefore, the conventional non-dissipative balance charging circuit is complex and comprises more devices than most other types of charging circuits. Since each device installed in the circuit will affect the stability of the whole circuit, therefore, the more complex and cumbersome of the devices are, the less stable and reliable of the circuit will be. Furthermore, the cost of this kind of charging circuit is high and the size of the circuit is not compactly built.

SUMMARY OF THE INVENTION

A primary object of the present invention is to provide a compact and lightweight charging circuit that allows a plurality of serially connected batteries having different levels of remaining power to be independently fully charged in a quick and safe manner.

To achieve the above and other objects, the charging circuit for balance charging serially connected batteries according to a preferred embodiment of the present invention includes a battery pack consisting of a plurality of serially connected batteries, wherein the batteries are connected to an output end and an input end of a power supply, from which a constant charge current source is supplied to the batteries; a changeover switch being serially connected to and between any two adjacent batteries, wherein the changeover switches may be connected to positive or negative electrodes of the batteries without particular limit; and a precision voltage detector being parallelly connected to each battery for detecting a voltage of the connected battery and sending out a detected result to a charging control circuit for the latter to control the ON/OFF of a corresponding changeover switch connected thereto. When the charging circuit is in use, the changeover switches are respectively set by their corresponding charging control circuits to ON, so that the constant charge current source is supplied from the power supply to each of the batteries to charge the same. And, when the voltage of a battery in the battery pack is detected by the corresponding precision voltage detector as having been fully charged, the changeover switch corresponding to that fully charged battery is set to OFF by the corresponding charging control circuit, so that the charge current source is not supplied to the fully charged battery, but is supplied to a following battery via a by-pass circuit parallelly connected to the fully charged battery. The remaining batteries in the battery pack are independently disconnected from the power supply one by one when they are fully charged, until the voltage different between the output end and the input end of the power supply is zero to indicate that the charging process is completed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 4:
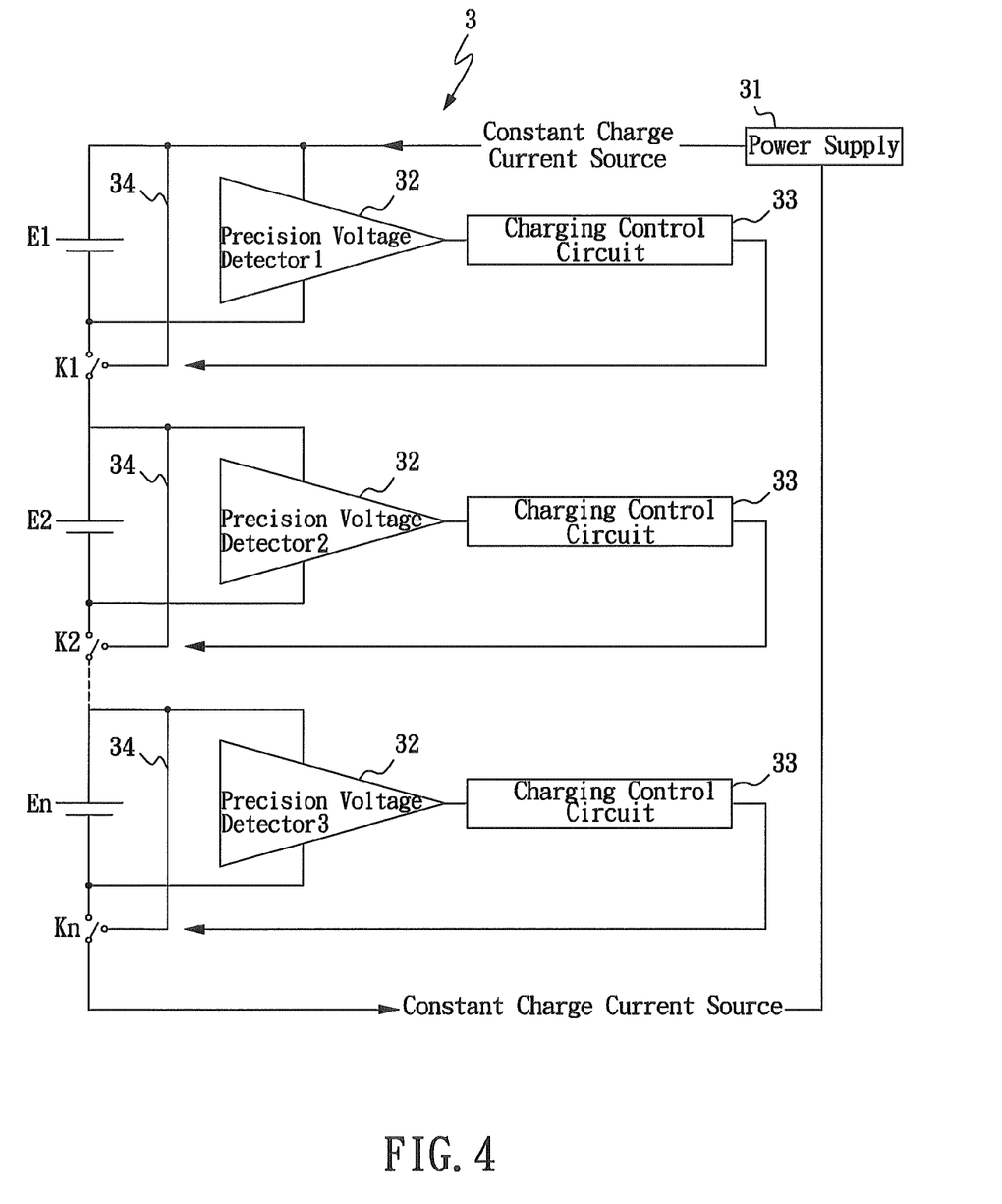
FIG. 4 is a schematic circuit diagram of a charging circuit for balance charging serially connected batteries according to a preferred embodiment of the present invention.

Please refer to FIG. 4 that is a schematic circuit diagram of a charging circuit 3 for balance charging serially connected batteries according to a preferred embodiment of the present invention. As shown, the charging circuit 3 includes a battery pack consisting of a plurality of serially connected batteries E1, E2, En, and being connected to a power supply 31, from which a constant charge current source is supplied to the battery pack. A changeover switch K1, K2, Kn is serially connected to and between any two adjacent batteries. It is noted the changeover switches K1, K2, Kn may be connected to positive or negative electrodes of the batteries without particular limit. And, each of the batteries E1, E2, En is connected to a precision voltage detector 32 in parallel, so that the precision voltage detector 32 may detect a voltage of the battery parallelly connected thereto and send a detected result to a charging control circuit 33. The charging control circuits 33 are independently connected to the changeover switches K1, K2, Kn for controlling the ON/OFF of the corresponding changeover switches K1, K2, Kn based on the detected results from corresponding precision voltage detectors 32.

When the charging circuit 3 according to the preferred embodiment of the present invention is in use, the charging control circuits 33 control and set the corresponding changeover switches K1, K2, Kn to ON, so that the constant charge current source from the power supply 31 is supplied to all the batteries E1, E2, En to charge the same. When any of the batteries E1, E2, En is detected by the precision voltage detector 32 parallelly connected thereto as having been fully charged, a message is immediately sent by the precision voltage detector 32 to inform the corresponding charging control circuit 33 of the fully charged battery, so that the charging control circuit 33 controls and sets the changeover switch K1, K2, or Kn connected thereto to OFF. At this point, the charge current source to the fully charged battery is supplied to a following battery via a by-pass circuit 34 parallelly connected to the fully charged battery. That is, the fully charged battery is not further charged. In this manner, other batteries that are subsequently fully charged are disconnected from the power supply one by one until all the batteries in the battery pack have been fully charged.

With the above arrangements, a plurality of serially connected batteries E1, E2, En may be independently detected and controlled by a corresponding charging control circuit 33 to stop charging when they are fully charged. That is, the charging circuit of the present invention is an intelligent charging circuit allowing the serially connected batteries to be independently charged. Once the battery is fully charged, it will not be continuously charged as all the charging current (energy) will be passed via the changeover switch to other path into other batteries that are not yet fully charged. The charge circuit of our invention is designed to provide a simplified balance circuit that no dissipation of excess charging energy is required. Further, the charge circuit of our invention is operated to charge the batteries with constant charge current, once the battery is fully charged, the corresponding changeover switch will disconnect the circuit, and the voltage different between the output end and the input end of the power supply 31 will be decreased regressively until all the batteries are fully charged. When the batteries are fully charged, reached a pre-determined valve, the constant charge current will flow from the output end of the power supply 31 directly back to input end of the power supply 31 to result the voltage different between the output end and the input end of the power supply 31 to be zero. Once the voltage different between the output end and the input end of the power supply 31 is zero, the charging operation is completed.

When the voltage different between the output end and the input end of the power supply 31 is less than the pre-determined valve, it indicates that the charging operation in the circuit is completed, wherein the pre-determined valve is set in according to a lowest voltage of the batteries as an indication of a fully charged valve.

Moreover, the charging circuit 3 can be operated in a regressive manner in accordance with one of characteristics of the charging circuit 3 of the present invention. As a result of the voltage difference between the output end and the input end of the power supply 31 will be 0v as the batteries or battery close to be fully charged, the charging process of the charging circuit 3 of the present invention can be set to operate from one charge mode to the next following charge mode. These charging modes are set to have different charging current which will be in a regressive manner. For example, the charge current from the first mode to the forth mode, can be 1 I→½ I→¼ I→⅙ I . . . etc. With a regressive manner of these modes, each battery can be completely charged.

For example, when the charge current of the first mode is 1 I, the charge current in second mode can be ½ I, the third mode of charge current can be ¼ I. In other words, the charge current of the charging circuit 3 is decreased as the number of the charge mode increased, and the batteries are charged through several charge modes in the regressive manner until they are fully charged. The pre-determined values of the charge currents and the pre-determined values of the charge modes can be proportionally decreased or disproportionally decreased when the number of charge mode increased. In other words, the charging method of the charge circuit 3 is not limited to a particular value or calculation. In fact, the charge circuit 3 and charging method of the present invention are not limited to the prescribed embodiments and examples, other methods in the regressive manner can be employed. Therefore, the charge current and pre-determined values of the charge modes the present invention are not limited to the examples mentioned in the embodiments 1 I→½ I→¼ I→⅙ . . . etc.

The charging operation/process of the charging circuit 3 in one embodiment of charging two batteries as discussed above comprises as following:

(1) starting the charging operation of the charging circuit 3;

(2) providing a maximum charging current, 1 I, to charge the batteries in a first mode of the charging operation;

(3) Detecting each battery individually whether any of battery reaches a first pre-determined valve, if so, a first signal is sent out by the precision voltage detector 32 to inform the corresponding charging control circuit 33 of the batteries E1 & E2 to switch the corresponding changeover switch K1 or K2 to a OFF state; if not, the batteries E1, E2 are continuously charged;

(4) Switching the corresponding changeover switch K1 or K2 to the OFF state via the charging control circuit 33 resulting, the charging of that battery to be suspended;

(5) Continuously charging the rest of the battery until it reaches the pre-determined value, the corresponding changeover switch to the OFF state via the charging control circuit 33 resulting;

(6) Detecting whether the voltage difference between positive and negative terminals of the charge circuit 3 reaches at 0v, if so, a control signal is sent out to charging control circuit 33 to unlock the OFF state of changeover switches K1 or K2 as the batteries are now completed the first mode of charging operation;

(7) Changing the first charge mode to a second charge mode of the charging operation via the charging control circuit 33 when the voltage of the circuit reaches 0v, and switching the changeover switches K1, k2 to the ON state again;

(8) providing a smaller new current, ½ I, to the batteries E1, E2 in the circuit to continuous the charging operation;

(9) Charging the batteries E1, E2 with the second charge current ½ I;

(10) Detecting each battery individually whether any of battery reaches a the pre-determined valve if so, a second signal is sent out by the precision voltage detector 32 to inform the corresponding charging control circuit 33 of the batteries E1 & E2 to switch the corresponding changeover switch K1 or K2 to a OFF state; if not, the batteries E1, E2 are continuously charged with the second charge current;

(11) Switching the corresponding changeover switch K1 or K2 to the OFF state via the charging control circuit 33 resulting, the charging of that battery to be suspended;

(12) Continuously charging the rest of the battery until it reaches the pre-determined value;

(13) Detecting whether the rest of battery reaches the pre-determined valve , if so, the second signal is sent out by the precision voltage detector 32 to inform the corresponding charging control circuit 33 of the batteries E1 or E2 to switch the corresponding changeover switch K1 or K2 to a OFF state;

(14) Detecting whether the voltage difference between positive and negative terminals of the charge circuit 3 reaches at 0v, if so, the control signal is sent out to charging control circuit 33 to unlock the OFF state of changeover switches K1 or K2 as the batteries are now completed the second mode of charging operation;

(15) Changing the second mode to a third mode of the charging operation via the charging control circuit 33 when the voltage difference between positive and negative terminals of the charge circuit 3 reaches 0v, and switching to the corresponding changeover switches to the ON state again;

(16) providing a smaller new current, ¼ I, to the batteries E1,E2 in the circuit to continuous the charging operation;

(17) Charging the batteries E1,E2 with the third charge current ¼ I;

(18) Detecting whether the rest of battery reaches the pre-determined valve , if so, the signal is sent out by the precision voltage detector 32 to inform the corresponding charging control circuit 33 of the batteries E1 or E2 to switch the corresponding changeover switch K1 or K2 to a OFF state;

(19) Detecting whether the voltage difference between positive and negative terminals of the charge circuit 3 reaches at 0v, if so, the control signal is sent out to charging control circuit 33 to unlock the OFF state of changeover switches K1 or K2 as the batteries are now completed the (n−1) mode of charging operation;

(20) changing the (n−1)mode to a (n) mode of the charging operation via the charging control circuit 33 when the voltage difference between the positive and negative terminals of the charge circuit 3 reaches 0v, and switching to the corresponding changeover switches to the ON state again;

(21) providing a smaller new current, (n) I, to the batteries E1, E2 in the circuit to continuous the charging operation;

(22) Charging the batteries E1, E2 with the (n) charge current n I (23) Detecting whether the pre-determined valve is reached in the circuit, if so, the control signal is sent out by the precision voltage detector 32 to inform the corresponding charging control circuit 33 to switch the changeover switches K1 or K2 to the OFF state;

(24) Detecting whether the voltage difference of the positive and negative terminals of the charge circuit 3 arrives at 0v, if so, the charging operation goes to step (25), if not, the changeover switches K1, k2 are continuously locked to OFF state by the charging control circuit 33 until the voltage of the charge circuit 3 drops to 0v; and (25) Terminating the charging operation.

Therefore, the charging circuit of the present invention is operated that one charging mode will be completed when the voltage different between the output end and the input end of the power supply 31 to be zero or to a pre-determined valve which is set in according to a lowest voltage of each battery as an indication of a fully charged valve.

Figure 5:
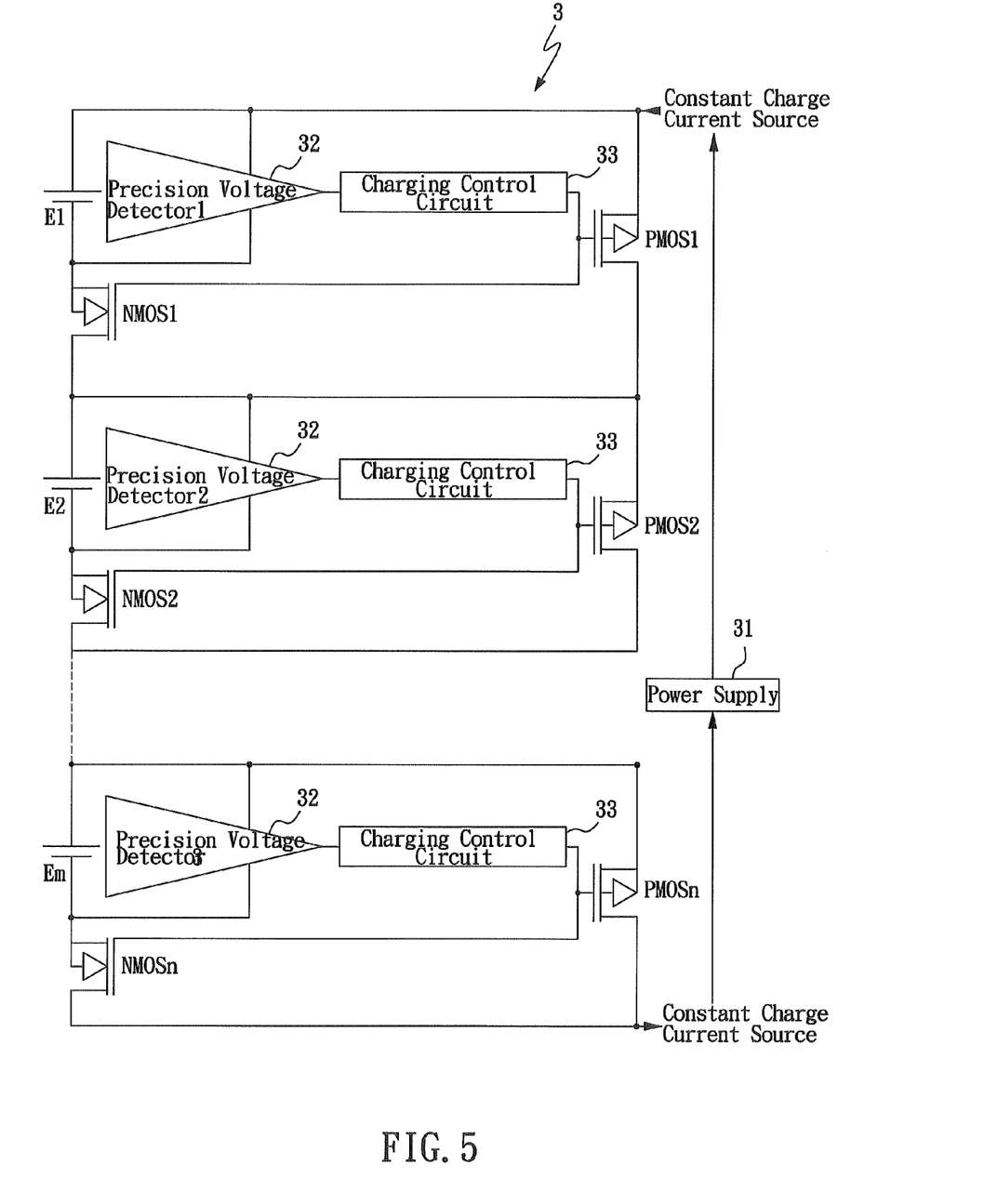
FIG. 5 is a schematic circuit diagram of a charging circuit for balance charging serially connected batteries according to another preferred embodiment of the present invention.

Please refer to FIG. 5 that is a schematic circuit diagram of a charging circuit for balance charging serially connected batteries according to another preferred embodiment of the present invention. The changeover switches K1, K2, Kn in the first embodiment are replaced by P/N type metal oxide semiconductors (MOS's) in the second embodiment. More specifically, an N-type metal oxide semiconductor NMOS1, NMOS2, NMOSn is provided between any two adjacent batteries E1, E2, En, and each of the charging control circuits 33 has a P-type metal oxide semiconductor PMOS1, PMOS2, PMOSn parallelly connected thereto. Wherein, each of the N-type MOS's is connected at a source to a preceding battery, at a drain to a following battery, and at a gate to an output of the corresponding charging control circuit 33; and each of the P-type MOS's is connected at a gate to the output of the corresponding charging control circuit 33, at a source to a positive electrode of the corresponding battery, and at a drain to the drain of the corresponding N-type MOS.

When the charging circuit 3 according to the other preferred embodiment of the present invention is in use, the charging control circuits 33 control and set the corresponding N-type metal oxide semiconductors NMOS1, NMOS2, NMOSn to ON, and the corresponding P-type metal oxide semiconductors PMOS1, PMOS2, PMOSn to OFF, so that all the batteries E1, E2, En in the battery pack are charged by the constant charge current source supplied thereto from the power supply 31. When any one of the batteries E1, E2, En is detected by the precision voltage detector 32 parallelly connected thereto as having been fully charged, a message is immediately sent by the precision voltage detector 32 to inform the corresponding charging control circuit 33 of the fully charged battery, so that the charging control circuit 33 controls and sets the N-type MOS corresponding to that fully charged battery to OFF, and the corresponding P-type MOS to ON. At this point, the charge current source to the fully charged battery is supplied to a following battery via the P-type MOS connected to the charging control circuit 33 of the fully charged battery. That is, the fully charged battery is not further charged. In this manner, other batteries that are subsequently fully charged are disconnected from the power supply one by one until all the batteries in the battery pack have been fully charged.

In the present invention, the charging control circuit 33 includes a potential offset circuit, a reset, a locker, and a switch driver. Please refer to FIG. 6. The potential offset circuit may be a photoelectric coupler 51. With the primary and the secondary insulation property of the photoelectric coupler 51, it is possible to realize the potential offset of different grounding reference signals. When a signal input to the precision voltage detector 32 has a reference point A, and a subsequently received electric input has an input reference point B, the photoelectric coupler 51 enables the realization of the transition of the signal of the precision voltage detector 32 from the reference point A to the reference point B. This is referred to as potential offset.

Figure 6:
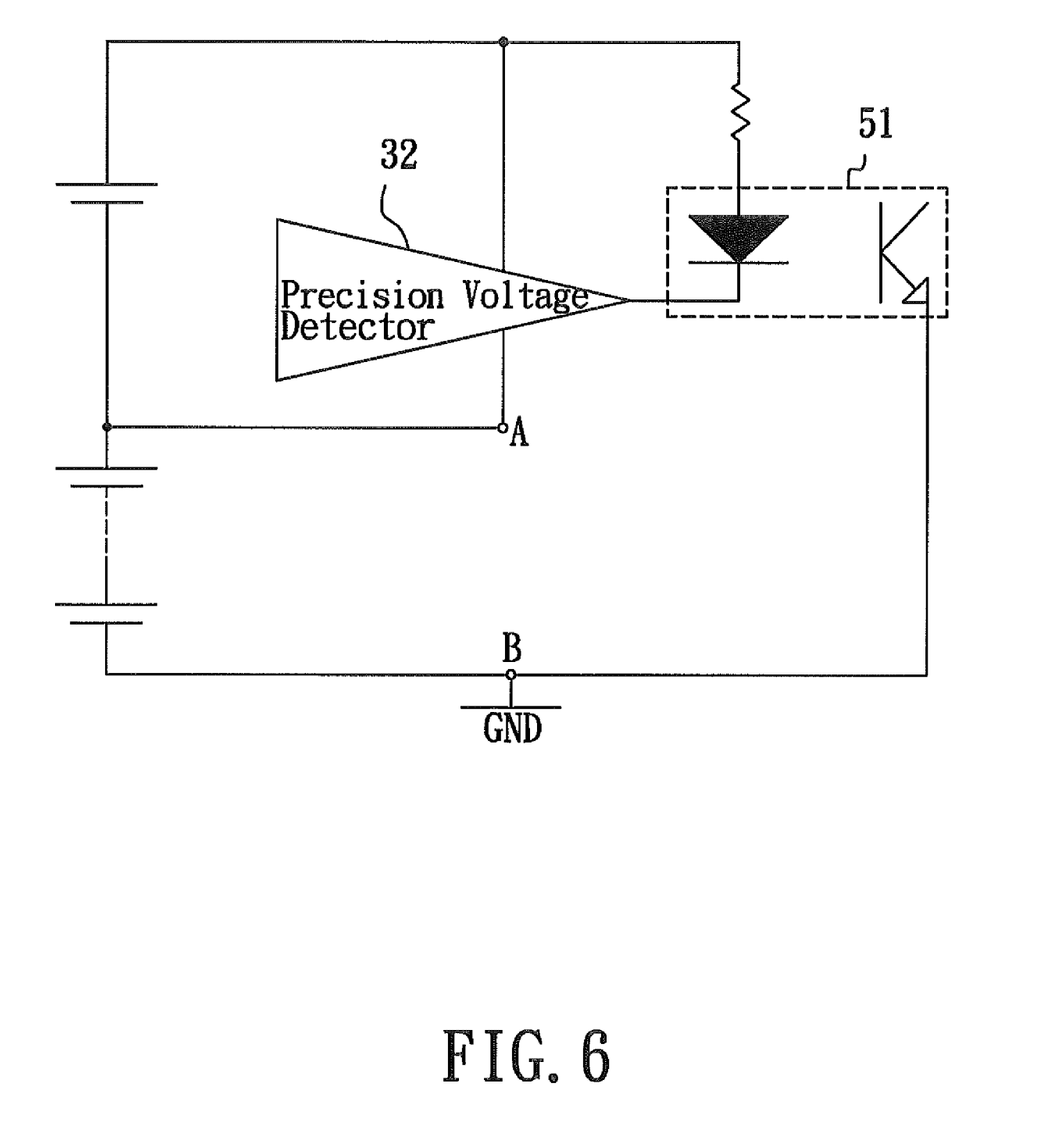
FIG. 6 schematically shows a potential offset circuit included in a charging control circuit of the charging circuit of the present invention.

The locker and the switch driver may consist of a microcontroller (MCU) and related software. When a potential offset output signal enters the microcontroller (MCU), the microcontroller (MCU) will detect the signal and outputs a corresponding control signal to drive the external changeover switches K1, K2, Kn to switch. Once the output signal from the microcontroller (MCU) is effective, it is no longer controlled by the precision voltage detector 32 but by a reset signal from the external power supply. When a reset signal reaches, the originally locked signal is reset. Similarly, the signal output by the microcontroller may have a potential offset to any other reference potential via other photoelectric couplers.

In the above illustrated embodiments, the batteries E1, E2, En may be high-capacity capacitors or Li-ion batteries. The charging circuit of the present invention has a wide range of applications, including charging battery packs for notebook computers; charging battery packs for Li-ion battery powered electric bicycles, electric motorcycles, electric tools, electric vessels, golf carts, and solar lighting fixture; charging battery packs for electric vehicles using combined power from pure Li-ion/Li-ion batteries and traditional engines; charging Li-ion battery packs for ignition of general automobiles; and charging battery packs having a plurality of serially connected Li-ion batteries.

What is claimed is:

1. A charging circuit, capable of simultaneously charging and balancing serially connected batteries, comprising:

a battery pack including a plurality of serially connected batteries, wherein the serially connected batteries are connected to an output end and an input end of a power supply so that a constant charge current source is supplied by the power supply to the battery pack;

a plurality of changeover switches, each of the plurality of changeover switches is serially connected to and between two adjacent ones of the serially connected batteries, wherein the plurality of changeover switches are connected to at least one of a positive electrode and a negative electrode of the serially connected batteries without a particular limit; and a plurality of precision voltage detectors, each of the plurality of precision voltage detectors is parallelly connected to one of the serially connected batteries for independently detecting a voltage of the serially connected battery parallelly connected thereto and sending out a detected result to a charging control circuit;

wherein the charging control circuit being independently connected to the plurality of changeover switches for controlling the plurality of changeover switches to ON or OFF based on the detected results sent from a plurality of corresponding precision voltage detectors;

wherein when the serially connected batteries are charged, the plurality of changeover switches are independently controlled by the charging control circuit connected thereto to ON so that the constant charge current source from the power supply is supplied to the serially connected batteries to charge the serially connected batteries;

wherein when any of the serially connected batteries is detected by at least one of the plurality of precision voltage detectors parallelly connected thereto as having been fully charged, a message is sent by at least one of the plurality of precision voltage detector to inform the corresponding charging control circuit of a fully charged battery, causing the charging control circuit to control the corresponding changeover switch to OFF so that the charge current source to the fully charged battery is supplied to a following battery via a by-pass circuit parallelly connected to the fully charged battery, and the fully charged battery is not further charged;

wherein a remaining battery that is subsequently fully charged is disconnected from the power supply one by one until a voltage different between the output end and the input end of the power supply is reached to a predetermined valve to indicate that the charging process is completed.

2. A charging circuit for balance charging serially connected batteries, comprising:

a battery pack including a plurality of serially connected batteries, and being connected to a power supply so that a constant charge current source is supplied by the power supply to the battery pack;

a plurality of N-type metal oxide semiconductors, each of the plurality of N-type metal oxide semiconductors is provided between two adjacent ones of the serially connected batteries;

a plurality of precision voltage detectors, each of the plurality of precision voltage detectors is parallelly connected to one of the plurality of serially connected batteries for independently detecting a voltage of a battery parallelly connected thereto and sending out a detected result to a charging control circuit, wherein the charging control circuit being independently connected to a plurality of changeover switches for controlling the plurality of changeover switches to ON or OFF based on the detected results sent from a plurality of corresponding precision voltage detectors; and a plurality of P-type metal oxide semiconductors, each of the plurality of P-type metal oxide semiconductors is parallelly connected to one of the charging control circuits;

wherein each of the plurality of N-type metal oxide semiconductors is connected at a source to a preceding battery, at a drain to a following battery, and at a gate to an output of a corresponding charging control circuit, wherein each of the P-type metal oxide semiconductors is connected at a gate to the output of the corresponding charging control circuit, at a source to a positive electrode of the corresponding battery, and at a drain to the drain of a corresponding N-type metal oxide semiconductor;

wherein when the plurality of serially connected batteries are charged, the plurality of charging control circuits independently control the corresponding N-type metal oxide semiconductors to ON, and a corresponding P-type metal oxide semiconductors to OFF so that the constant charge current source from the power supply is supplied to each of the plurality of serially connected batteries to charge the plurality of serially connected batteries;

wherein when any of the plurality of serially connected batteries is detected by the plurality of precision voltage detector parallelly connected thereto as having been fully charged, at least one of the plurality of precision voltage detector sends out a message to inform the corresponding charging control circuit of a fully charged battery, causing the corresponding charging control circuit to control the corresponding N-type metal oxide semiconductor corresponding to the fully charged battery to OFF, and the corresponding P-type metal oxide semiconductor to ON so that the charge current source to the fully charged battery is supplied to a following battery via the P-type metal oxide semiconductor connected to the charging control circuit of the fully charged battery, and the fully charged battery is not further charged;

wherein a remaining battery that is subsequently fully charged is disconnected from the power supply one by one until all of the plurality of serially connected batteries in the battery pack have been fully charged.

3. The charging circuit for balance charging serially connected batteries as claimed in claim 1, wherein the plurality of serially connected batteries are selected from the group consisting of: high-capacity capacitors and Li-ion batteries.

4. The charging circuit for balance charging serially connected batteries as claimed in claim 2, wherein the plurality of serially connected batteries are selected from the group consisting: of high-capacity capacitors and Li-ion batteries.

5. The charging circuit for balance charging serially connected batteries as claimed in claim 1, wherein the pre-determined value is set in according to a lowest voltage of each battery as an indication of a fully charged valve.

6. The charging circuit for balance charging serially connected batteries as claimed in claim 1, wherein the voltage different between the output end and the input end of the power supply is zero when the charging process is completed.

* * * * *